United States Patent [19]
Mohrhauser et al.

[11] Patent Number: 5,787,799
[45] Date of Patent: Aug. 4, 1998

[54] LIQUID BASTER

[75] Inventors: Jean Mohrhauser; Stephen R. Horvath, both of Racine, Wis.

[73] Assignee: Versa Technologies, Inc., Racine, Wis.

[21] Appl. No.: 702,810

[22] Filed: Aug. 26, 1996

[51] Int. Cl.⁶ .................................................. A47J 37/10
[52] U.S. Cl. .................. 99/345; 99/494; 99/532; 222/215
[58] Field of Search ................ 99/345, 346, 494, 99/532; 222/206, 215

[56] References Cited

U.S. PATENT DOCUMENTS

| | | | |
|---|---|---|---|
| D. 59,646 | 11/1921 | Fraass . | |
| D. 192,039 | 1/1962 | Jones et al. . | |
| D. 194,419 | 1/1963 | Whitton, Jr. . | |
| D. 197,795 | 3/1964 | Friedman et al. . | |
| D. 200,376 | 2/1965 | Weichselbaum . | |
| D. 206,039 | 10/1966 | Cronin, Jr. . | |
| D. 234,228 | 1/1975 | Spiegel . | |
| 811,801 | 2/1906 | Smith | 222/215 X |
| 2,073,303 | 3/1937 | Holder | 222/215 |
| 2,115,959 | 5/1938 | Lewis . | |
| 2,130,533 | 9/1938 | Barton | 99/345 |
| 2,234,884 | 3/1941 | Teel | 99/345 |
| 2,652,765 | 9/1953 | Risco | 99/345 |
| 3,295,523 | 1/1967 | Weichselbaum | 222/215 |
| 3,319,838 | 5/1967 | Bayles et al. | 222/215 |
| 3,354,883 | 11/1967 | Southerland | 222/215 X |
| 4,023,305 | 5/1977 | Harschel | 47/81 |
| 4,129,066 | 12/1978 | Corley | 99/345 |
| 5,408,919 | 4/1995 | Hutzler et al. | 99/345 |

*Primary Examiner*—Reginald L. Alexander
*Attorney, Agent, or Firm*—Quarles & Brady

[57] ABSTRACT

A baster or like device includes a liquid tube and a squeezable, resilient suction bulb. The suction bulb includes a series of radially spaced scallops or indentations about its outer surface, which provide ergonomic advantages in gripping the suction bulb. Further, the spacing between the indentations defines a series of lands, which function to bias the suction bulb to its undeformed condition. The suction bulb is removably mounted to the liquid tube, and a pair of sealing rings are located toward the rearward end of the liquid tube. The suction bulb includes internal grooves which receive and mate with the sealing rings. The forward end of the suction bulb engages a shoulder defined by a stop ring formed on the liquid tube. This structure provides a fluid-tight seal between the liquid tube and the suction bulb, to prevent leakage of air or other fluid during use.

17 Claims, 1 Drawing Sheet

U.S. Patent  Aug. 4, 1998  5,787,799
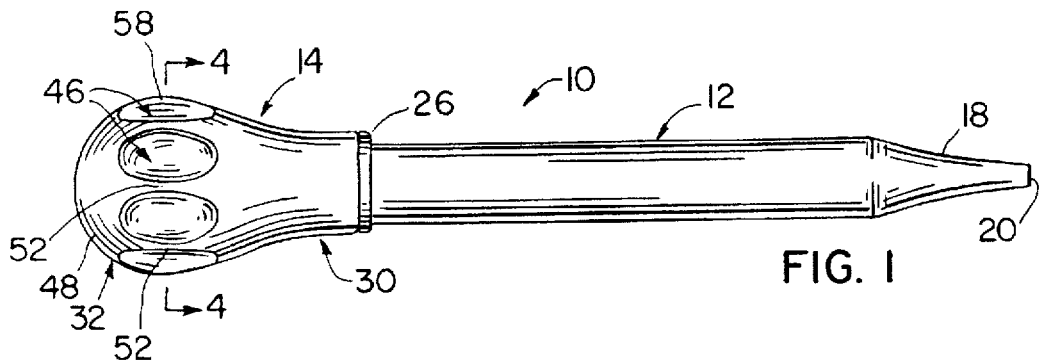
FIG. 1
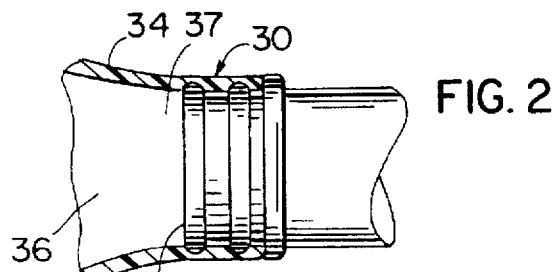
FIG. 2
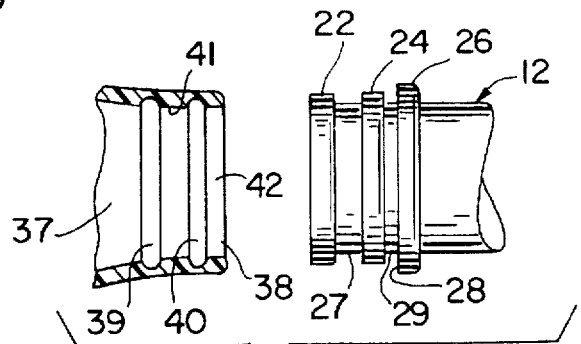
FIG. 3
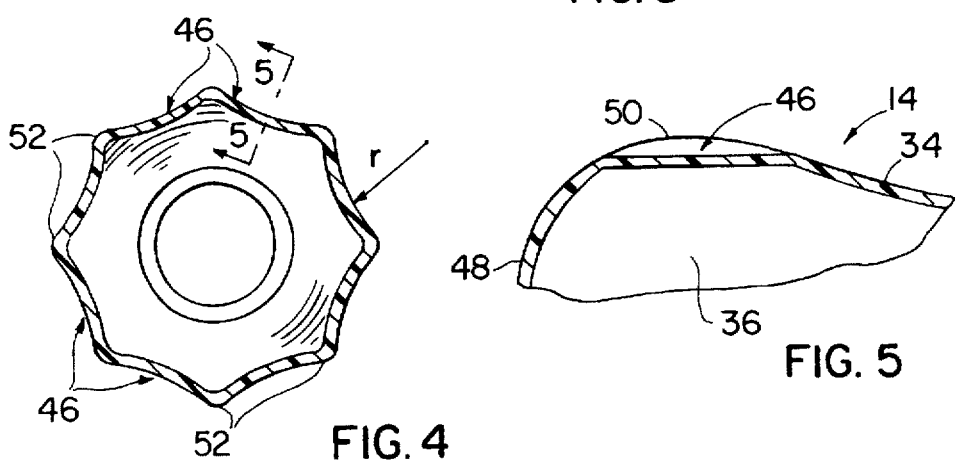
FIG. 4
FIG. 5

LIQUID BASTER

BACKGROUND AND SUMMARY OF THE INVENTION

This invention relates to kitchen utensils, and more particularly to a kitchen utensil commonly known as a baster. More broadly, however, the invention relates to a suction device utilizing a tube having a restricted passage opening onto one end, and a suction bulb mounted to an opposite end.

A conventional baster includes a tube defining an internal passage. The tube has a restricted passage which opens onto its forward end, and a vacuum or suction bulb mounted to its rearward end. The suction bulb defines an internal cavity in communication with the internal passage of the tube through an open rear end of the tube. The bulb is compressed to force air out of the bulb internal cavity through the restricted passage. The forward end of the tube is then placed into a liquid or other fluid, and pressure on the bulb is released. The bulb is formed of a resilient material such as FDA approved food grade silicone rubber, which causes the bulb to return to its original configuration when pressure is released. This introduces suction into the internal passage of the tube, which functions to draw a volume of liquid into the tube passage corresponding to the volume of air originally displaced from the tube upon compression of the suction bulb. The liquid is then ejected from the tube by subsequently squeezing the suction bulb.

Prior art basters have employed a friction-type fit between the rear end of the tube and the forward end of the suction bulb. This provides an inadequate seal between the tube and the bulb, and results in leakage of air when the suction bulb is compressed and also leakage of liquid in the event liquid makes its way into the suction bulb. In addition, prior art basters have employed suction bulbs formed of a material such as rubber, which are configured so as to provide a smooth outer surface. Such basters typically have a relatively thick wall in order to provide resistance to material breakdown caused by exposure to heat and other detrimental conditions. With this construction, the volume of the suction bulb internal cavity is relatively small, resulting in the baster being capable of taking in a relatively small volume of liquid.

It is an object of the present invention to provide a baster or similar type device having an improved suction bulb construction providing ease of use. It is a further object of the invention to provide such a device which is capable of maintaining a tight seal between the liquid tube and a removably mounted suction bulb. It is a further object of the invention to provide such a device which has the ability to intake a relatively large volume of liquid without increasing the overall external dimensions of the suction bulb. Yet another object of the invention is to provide such a device which is capable of withstanding repeated exposures to harsh conditions, such as high temperature liquid environments.

In accordance with one aspect of the invention, a baster includes a liquid tube defining an internal passage and a restricted opening at its forward end. The tube defines a rearward end having an opening leading into the internal passage. A pair of sealing rings are located adjacent the rearward end of the tube and are preferably formed integrally with the tube. One of the sealing rings is preferably located at the rearward end of the tube, and the other sealing ring is spaced forwardly therefrom. A suction bulb is mounted to the rearward end of the tube. The suction bulb defines a forward neck portion and a rearward bulbous portion, and internal grooves are formed in the forward neck portion for mating with the pair of spaced sealing rings to provide a fluid-tight connection between the liquid tube and the suction bulb. At least the neck portion of the suction bulb is formed of a material having sufficient expandability and resiliency to enable the neck portion to have a normal transverse dimension slightly less than that of the tube adjacent the sealing rings. With this construction, the neck portion exerts a restrictive, peripheral inward force on the liquid tube, to provide a tight seal between the suction bulb and the liquid tube. The liquid tube further defines stop structure, such as in the form of an outwardly extending ring, located forwardly of the forwardmost sealing ring. The stop structure engages a forward end of the suction bulb neck portion, to prevent the neck portion from sliding forwardly over the sealing rings when mounting the suction bulb to the liquid tube.

In accordance with another aspect of the invention, a baster or the like is constructed of a suction bulb mounted to a liquid tube, and the suction bulb includes a series of indentations on an external surface thereof. The suction bulb includes a forward neck portion and a rear bulbous portion, and the indentations are formed about the periphery of the bulbous portion. In a preferred form, the bulbous portion defines a convex curvature between the neck portion and the rearward end of the suction bulb. The indentations are concave, and are located on the suction bulb at the point of the maximum diameter of the bulbous portion. The indentations define a series of spaced lands formed by the convex curvature of the bulbous portion between the indentations. The indentations extend in an axial direction forwardly and rearwardly relative to the point of maximum diameter of the bulbous portion. The indentations are engaged by the user's fingers when squeezing the suction bulb, thus providing an ergonomic improvement over prior art designs, and also function to assist the suction bulb in resiliently returning to its original configuration when the squeezing force exerted on the suction bulb is relieved.

In a particularly preferred form, the separate aspects of the invention as summarized above are combined to provide significant advantages in construction and operation over the prior art. However, it is understood that the separate aspects can be employed individually.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is an elevation view showing a baster constructed according to the invention, utilizing a suction bulb mounted to a liquid tube;

FIG. 2 is an enlarged partial section view of the baster of FIG. 1, showing engagement of the suction bulb with the liquid tube;

FIG. 3 is a view similar to FIG. 2, showing the suction bulb removed from the liquid tube;

FIG. 4 is a section view taken along line 4—4 of FIG. 1; and

FIG. 5 is a partial section view taken along line 5—5 of FIG. 4.

DETAILED DESCRIPTION OF THE INVENTION

As shown in FIG. 1, a liquid baster 10 includes a liquid tube 12 and a suction bulb 14. While the following description will refer to the construction of baster 10, it is understood that the features shown and described could be employed in any device utilizing a resilient, squeezable bulb, or a device in which a resilient bulb is removably mounted to a structure.

Liquid tube 12 defines a constant-diameter internal passage which extends between its rearward end, shown in FIG. 2 at 16, and a restricted forward end portion 18. Forward end portion 18 defines a restricting passageway between the constant-diameter internal passage defined by liquid tube 12, and an orifice formed in the forward end 20 of forward end portion 18. This construction of liquid tube 12 is conventional in the art.

In accordance with the invention, liquid tube 12 includes a pair of annular sealing rings 22, 24 and an annular stop ring 26 toward its rear end 16, as shown in FIGS. 2 and 3. Sealing ring 22 is located at liquid tube rear end 12, and sealing ring 24 is spaced forwardly therefrom. An annular outer surface 27 of liquid tube 12 separates sealing rings 22, 24. Stop ring 26 is spaced forwardly from forward sealing ring 24, and defines a shoulder 28 extending outwardly from the outer surface of liquid tube 12. An annular outer surface 29 of liquid tube 12 separates sealing ring 24 and stop ring 26.

Sealing rings 22, 24 are each formed with relatively square shoulders which extend outwardly from the outer surface of liquid tube 12. In one embodiment, sealing rings 22, 24 may be spaced apart approximately 0.20 inches, and stop ring 26 may be located such that its shoulder 28 is spaced approximately 0.118 inches forwardly from the forward shoulder of forward sealing ring 24. Liquid tube outer surfaces 27 and 29 may have a diameter of approximately 1.0 inches; forward sealing ring 24 may have a diameter of approximately 1.120 inches; rear sealing ring 22 may have a diameter of approximately 1.130 inches; and stop ring 26 may have a diameter of approximately 1.20 inches. Rings 22, 24 and 26 each have a width of approximately 0.125 inches. Outer surface 27 has a width of approximately 0.187 inches and outer surface 29 has a width of approximately 0.125 inches.

Referring to FIG. 1, suction bulb 14 generally defines a forward neck portion 30 and a rearward bulbous portion 32. Neck portion 30 is constructed so as to be removably engageable with the rear end of liquid tube 12, as will be explained. Suction bulb 14 is preferably formed of a silicone material in an injection molded process. The material of suction bulb 14 representatively may be any satisfactory FDA approved food grade silicone rubber, commercially available from many different sources. This material provides extremely satisfactory operation, and exhibits an ability to withstand the high temperature liquid environments to which baster 10 is exposed, both during use and during cleaning in a dishwasher or the like. It is understood, however, that other similar materials could be used to form suction bulb 14.

Suction bulb neck portion 30 and bulbous portion 32 are formed of an integral wall 34 defining an internal cavity 36 and a passage 37 extending between internal cavity 36 and the forward end of suction bulb 14, shown at 38. As shown in FIGS. 2 and 3, the portion of wall 34 defining neck portion 30 has a pair of spaced grooves 39, 40 formed in its inner surface opening into passage 37. Grooves 39 and 40 are spaced apart so as to receive and mate with sealing rings 22 and 24, respectively on liquid tube 12. An annular inner surface section 41 of suction bulb wall 34 is disposed between grooves 39 and 40, and engages liquid tube outer surface 27. Similarly, an annular inner surface section 42 of suction bulb wall 34 is disposed between groove 40 and suction bulb forward end 38, and engages liquid tube outer surface 29.

The forward end 38 of suction bulb 14 engages stop ring shoulder 28, as shown in FIG. 2. With this arrangement, engagement of suction bulb forward end 38 with stop ring shoulder 28 prevents neck portion 30 from sliding past stop ring 26 when engaging suction bulb 14 with liquid tube 12.

Suction bulb neck portion 30 defines an internal diameter approximately equal to the external diameter of liquid tube 12 adjacent sealing rings 22, 24. Preferably, suction bulb inner surfaces 41 and 42 provide a stepped configuration such that inner surface section 41 has a smaller internal diameter than inner surface section 42. The resiliency of the material from which suction bulb 14 is constructed enables suction bulb neck portion 30 to expand somewhat as it is forced forwardly onto the rearward end portion of liquid tube 12. Once engaged with liquid tube 12, suction bulb neck portion 30 returns to its configuration as shown in FIGS. 1 and 2 to tightly engage grooves 39, 40 with sealing rings 22, 24 and suction bulb inner surface sections 41, 42 with liquid tube outer surfaces 27, 29, respectively. This provides a fluid-tight seal between suction bulb 14 and liquid tube 12. The stepped configuration of suction bulb internal passage 37 facilitates initial engagement of suction bulb 12 with the rear end of liquid tube 12, and provides an especially tight seal by engagement of suction bulb inner surface section 41 with liquid tube outer surface 27.

Representatively, suction bulb inner surface section 41 may have an internal diameter of 1.063 inches, and inner surface section 42 may have an internal diameter of 1.08 inches. Liquid tube 12, including its outer surface sections 27 and 29, may have an outside diameter of 1.0 inches, as noted above. Suction bulb grooves 39, 40 may representatively each have radii of 0.0618 inches. The radiused construction of grooves 39, 40 functions to tightly grip the square edges of sealing rings 22, 24, respectively, to firmly secure suction bulb 14 to liquid tube 12 in a manner providing an air tight seal therebetween.

Referring to FIGS. 1 and 4, bulbous portion 32 of suction bulb 14 is provided with a series of radially spaced, outwardly facing scallops or indentations 46. Indentations 46 are generally oval, with each extending along a major axis parallel to the longitudinal axis of suction bulb 14 and the longitudinal axis of liquid tube 12.

Suction tube bulbous portion 32 is defined by a convex curved wall 48 which extends between neck portion 30 and the rearward end of suction bulb 14. Curved wall 48 provides a maximum diameter 50 to bulbous portion 32, and indentations 46 extend forwardly and rearwardly relative to the maximum diameter 50 of bulbous portion 32. The spacing between indentations 46 defines a series of spaced outer wall lands 52.

Each indentation 46 is in the form of a channel extending in a forward-rearward direction parallel to the longitudinal axis of suction bulb 14. That is, each indentation 46 has a curvature throughout its length corresponding to radius r (FIG. 4), such that each indentation 46 has a maximum depth at bulb maximum diameter 50, with each indentation 46 shallowing in both forward and rearward directions from its point of maximum depth to its intersection with outer wall 48. As shown in FIG. 4, suction bulb 14 has a substantially uniform thickness throughout the cross-section of bulbous portion 32, both at indentations 46 and lands 52.

Representatively, suction bulb 14 may have a maximum diameter 50 of approximately 2.15 inches, and radius r of indentations 46 may be approximately 0.909 inches.

Indentations 46 are adapted to receive the fingertips of a user during use, to provide an improved gripping area for suction bulb 14. In addition, the provision of lands 52 between indentations 46 function to provide a natural resilient bias for returning bulbous portion 32 to its undeformed condition (as shown in FIG. 1) when a squeezing or compressive force on suction bulb 14 is relieved.

In use, baster 10 is first assembled by pushing suction bulb 14 onto the rearward end of liquid tube 12 as described above, such that suction bulb forward end 38 engages sealing ring shoulder 28. As noted, the resiliency of the material of suction bulb 14 expands neck portion 30 when mounting suction bulb 14 to liquid tube 12, and tightens neck portion 30 onto sealing rings 22 and 24 and liquid tube outer surfaces 27, 29, to provide a fluid-tight seal between suction bulb 14 and liquid tube 12. The user then operates baster 10 the same as prior art basters, by squeezing suction bulb 14 to force air out of liquid tube 12 through the opening in forward end 20, which is then placed into a quantity of liquid. The squeezing or compressive force on suction bulb 14 is then relieved, and suction bulb 14 returns to its undeformed condition as shown in FIG. 1 under the influence of the outward biasing force exerted by suction bulb lands 52 between indentations 46. This draws liquid into the passage of tube 12, and baster 10 is then positioned to a location where the liquid is to be ejected. The tightness of the seal between suction bulb 14 and liquid tube 12 enables the user to maintain baster 10 in a vertical orientation without liquid dripping from forward end 20 of liquid tube 12. The user then again squeezes or compresses suction bulb 14 to eject the liquid therefrom.

After use, suction bulb 14 is removed from liquid tube 12 by exerting a rearward pull-off force on suction bulb 14, which disengages neck portion 30 from the rear end portion of liquid tube 12. The separated components of baster 10 can then be washed such as in a conventional dishwasher, in preparation for subsequent use. It has been found that the silicone material of suction bulb 14 is capable of withstanding a large number of repeated exposures to high temperatures and hot liquids, without breaking down and while maintaining the resiliency required for mounting suction bulb 14 to liquid tube 12 and for returning suction bulb 14 to its original condition when squeezing or compressive forces thereon are relieved. Further, the material of suction bulb 14 can be formed with relatively thin walls, to maximize the volume of internal cavity 36 and thereby the amount of liquid which can be drawn into liquid tube 12.

Various alternatives and embodiments are contemplated as being within the scope of the following claims particularly pointing out and distinctly claiming the subject matter regarded as the invention.

We claim:

1. A baster, comprising:
 a liquid tube having a first end and a second end and defining an internal passage extending therebetween, wherein the tube first end defines a restricted opening in communication with the internal passage and wherein the tube includes a pair of spaced sealing rings toward its second end; and
 a resilient suction bulb removably mounted to the tube second end, wherein the suction bulb defines an open forward end and an internal cavity and includes a pair of spaced grooves adjacent its open forward end for receiving the pair of sealing rings when the bulb is mounted to the tube, and wherein the bulb defines a closed rearward end and includes a plurality of radially spaced channel-like indentations on a portion of the bulb defining the internal cavity, wherein the indentations extend in a forward-rearward direction and are arranged such that the forward and rearward ends of the suction bulb are free of indentations.

2. A baster, comprising:
 a liquid tube having a first end and a second end and defining an internal passage extending therebetween, wherein the tube first end defines a restricted opening in communication with the internal passage and wherein the tube includes a pair of spaced sealing rings toward its second end; and
 a resilient suction bulb removably mounted to the liquid tube second end, wherein the suction bulb defines an open end and an internal cavity and includes a pair of spaced grooves adjacent its open end for receiving the sealing rings when the bulb is mounted to the tube.

3. The baster of claim 2, wherein the spaced sealing rings are formed on the exterior of the tube adjacent its second end, and wherein the spaced grooves on the suction bulb are formed on an interior surface of the suction bulb adjacent the open end of the suction bulb.

4. The baster of claim 3, wherein the liquid tube defines first and second annular outer surfaces located one adjacent each sealing ring, each outer surface defining a transverse dimension, and wherein the suction bulb defines forward and rearward inner annular surfaces for overlying the liquid tube first and second annular outer surfaces, respectively, wherein the suction bulb forward inner surface is located between the suction bulb open end and a forward one of the spaced grooves and the suction bulb rearward inner surface is located between the spaced grooves.

5. The baster of claim 4, wherein the liquid tube first and second annular outer surfaces have substantially the same first transverse dimension, and wherein the suction bulb forward and rearward annular surfaces each define a transverse dimension less than the first transverse dimension, and wherein at least a forward portion of the suction bulb adjacent the annular surfaces is formed of a resilient material enabling the suction bulb forward portion to expand during engagement with the liquid tube and the sealing rings.

6. A baster comprising:
 a liquid tube having a first end and a second end and defining an internal passage therebetween, wherein the tube first end defines a restricted opening in communication with the internal passage and wherein the tube includes a pair of spaced sealing rings toward its second end formed on the exterior of the tube and first and second annular outer surfaces located on adjacent each sealing ring each outer surface defining a transverse dimension, wherein the first and second annular outer surfaces have substantially the same first transverse dimension, and
 a resilient suction bulb removably mounted to the liguid tube second end, wherein the suction bulb defines an open end and an internal cavity and includes a pair of spaced grooves formed on an interior surface of the suction bulb adjacent its open end for receiving the sealing rings when the bulb is mounted to the tube, wherein the suction bulb defines forward and rearward inner annular surfaces for overlying the liquid tube first and second annular outer surfaces, respectively, wherein the suction bulb forward inner surface is located between the suction bulb open end and a forward one of the spaced grooves and the suction bulb rearward inner surface is located between the spaced grooves, wherein the suction bulb forward and rearward annular surfaces each define a transverse dimension less than the first transverse dimension, and wherein at least a forward portion of the suction bulb adjacent the annular surfaces is formed of a resilient material enabling the suction bulb forward portion to expand during engagement with the liquid tube and the sealing rings, wherein the suction bulb rearward annular surface defines a transverse dimension less than that of the suction bulb forward annular surface.

7. A baster comprising:

a liquid tube having a first end and a second end and defining an internal passage extending therebetween, wherein the tube first end defines a restricted opening in communication with the internal passage and wherein the tube includes a pair of spaced sealing rings toward its second end, wherein the liquid tube includes an outwardly extending stop ring; and a resilient suction bulb removably mounted to the liquid tube second end, wherein the suction bulb defines an open end and an internal cavity and includes a pair of spaced grooves adjacent its open end for receiving the sealing rings when the bulb is mounted to the tube, and wherein the suction bulb neck portion terminates in a forward end engageable with the stop ring.

8. A baster, comprising:

a liquid tube having a first end and a second end and defining an internal assage extending therebetween, wherein the tube first end defines a restricted opening in communication with the internal passage and wherein the tube includes a pair of spaced sealing rings toward its second end, wherein the spaced sealing rings are formed in the exterior of the tube adjacent its second end, and wherein the tube further includes outwardly extending stop structure formed on the tube, wherein the sealing rings are located between the stop structure and the second end of the liquid tube; and a resilient suction bulb removably mounted to the liquid tube second end, wherein the suction bulb defines an open end and an internal cavity and includes a pair of spaced grooves formed on an interior surface of the suction bulb adjacent its open end for receiving the sealing rings when the bulb is mounted to the tube, and wherein the open end of the suction bulb engages the stop structure when the bulb is mounted to the tube.

9. The baster of claim 8, wherein one of the sealing rings is located at the second end of the liquid tube, and wherein the other of the sealing rings is spaced therefrom toward the first end of the liquid tube.

10. The baster of claim 8, wherein the stop structure comprises an external stop ring.

11. A baster, comprising:

a liquid tube having a first end and a second end and defining an internal passage extending therebetween, wherein the tube first end defines a restricted opening in communication with the internal passage; and a resilient suction bulb mounted to the liquid tube second end, wherein the suction bulb defines an internal cavity and includes a plurality of spaced indentations on a portion of the bulb defining the internal cavity, wherein the suction bulb extends along a longitudinal axis between a rearward end and a forward end, wherein the forward end of the suction bulb is mounted to the liquid tube second end, and wherein the indentations are arranged in a ring about the periphery of the suction bulb such that the forward end of the suction bulb and the rearward end of the suction bulb are free of indentations.

12. The baster of claim 11, wherein the indentations extend in a forward-rearward direction substantially parallel to the suction bulb longitudinal axis.

13. The baster of claim 11, wherein the forward end of the suction bulb defines a neck portion engageable with the tube, and wherein the suction bulb includes a bulbous portion defined by a convex outer surface extending between the neck portion and the rearward end of the suction bulb.

14. The baster of claim 14, wherein the convex curvature of the bulbous portion defines a maximum diameter at a location forwardly of the suction bulb rearward end, and wherein the indentations are oriented so as to extend forwardly and rearwardly relative to the location of maximum diameter of the bulbous portion.

15. The baster of claim 14, wherein the curvature of the bulbous portion defines a series of lands, each of which is located between a pair of adjacent indentations.

16. The baster of claim 12, wherein each indentation comprises axially extending channel-like structure extending along an axis parallel to the longitudinal axis of the suction bulb.

17. The baster of claim 11, wherein the bulbous portion of the suction bulb has a substantially uniform wall thickness adjacent and including the indentations.

* * * * *